(12) United States Patent
Starke et al.

(10) Patent No.: US 11,549,156 B2
(45) Date of Patent: Jan. 10, 2023

(54) SMELTING ASSEMBLY FOR THE PRODUCTION OF STEEL

(71) Applicant: SMS GROUP GMBH, Düsseldorf (DE)

(72) Inventors: Peter Starke, Duisburg (DE); Andreas Schüring, Mülheim (DE); Thomas Henkel, Duisburg (DE); Hans-Jürgen Odenthal, Mettmann (DE)

(73) Assignee: SMS GROUP GMBH, Düsseldorf (DE)

( * ) Notice: Subject to any disclaimer, the term of this patent is extended or adjusted under 35 U.S.C. 154(b) by 0 days.

(21) Appl. No.: 16/978,378

(22) PCT Filed: Mar. 5, 2019

(86) PCT No.: PCT/EP2019/055408
§ 371 (c)(1),
(2) Date: Sep. 4, 2020

(87) PCT Pub. No.: WO2019/170650
PCT Pub. Date: Sep. 12, 2019

(65) Prior Publication Data
US 2021/0040573 A1    Feb. 11, 2021

(30) Foreign Application Priority Data

Mar. 6, 2018 (DE) ...................... 10 2018 203 279.3
Mar. 5, 2019 (DE) ...................... 10 2019 105 498.2

(51) Int. Cl.
*C21C 5/04* (2006.01)
*F27B 3/08* (2006.01)
(Continued)

(52) U.S. Cl.
CPC ................ *C21C 5/04* (2013.01); *F27B 3/085* (2013.01); *F27B 3/225* (2013.01); *F27D 17/002* (2013.01)

(58) Field of Classification Search
CPC ..... C21C 5/04; C21C 5/28; C21C 5/52; F27B 3/085; F27B 3/225; F27D 17/002
(Continued)

(56) References Cited

U.S. PATENT DOCUMENTS 3,812,275 A * 5/1974 Schempp ............... F27D 17/003
373/9
3,955,964 A * 5/1976 MacDonald ............ C21C 5/562
75/10.42

(Continued)

FOREIGN PATENT DOCUMENTS

DE    10115779 A1    4/2002
EP    0717115 A1    6/1996
(Continued)

*Primary Examiner* — Jessee R Roe
*Assistant Examiner* — Michael Aboagye
(74) *Attorney, Agent, or Firm* — Lucas & Mercanti, LLP; Klaus P. Stoffel

(57) ABSTRACT

An improved apparatus for producing steel, including a lower furnace, an annular, water-cooled, fireproof lined cylindrical upper furnace, on which an upwardly closing conically tapering hat having openings can be placed. The smelting assembly is configured for the operational mode without melt flow and the operational mode with melt flow. To this end, at least one opening is provided in the conical furnace cover, through which opening at least one top lance can be introduced into the upper furnace. A plurality of sidewall injectors radially rotate around the cylindrical upper furnace in such a way that in a working position, the top lance and the sidewall injectors are directed onto a smelt level of a molten mass located in the lower furnace for refining.

6 Claims, 1 Drawing Sheet

(51) Int. Cl.
*F27B 3/22* (2006.01)
*F27D 17/00* (2006.01)

(58) Field of Classification Search
USPC ........ 266/44, 144, 171, 158, 225; 373/2, 60, 373/72, 73, 74, 76, 78, 81
See application file for complete search history.

(56) References Cited

U.S. PATENT DOCUMENTS

| | | | | |
|---|---|---|---|---|
| 5,410,566 | A * | 4/1995 | Steins | C21C 5/5211 |
| | | | | 373/82 |
| 5,602,867 | A * | 2/1997 | Hubers | F27B 3/04 |
| | | | | 373/78 |
| 5,802,098 | A * | 9/1998 | Birrenbach | C21C 5/42 |
| | | | | 266/143 |
| 7,717,976 | B2 * | 5/2010 | Coe | C22C 33/04 |
| | | | | 75/10.49 |
| 8,562,713 | B2 * | 10/2013 | Guliana | C22B 9/20 |
| | | | | 75/10.66 |
| 2014/0355642 | A1 * | 12/2014 | Kleinschmidt | H05B 7/109 |
| | | | | 373/88 |
| 2017/0280519 | A1 * | 9/2017 | Lasorda | F27D 11/08 |
| 2018/0100207 | A1 | 4/2018 | Nörthemann | |

FOREIGN PATENT DOCUMENTS

| | | |
|---|---|---|
| JP | H04235209 A | 8/1992 |
| WO | 2016162016 A1 | 10/2016 |
| WO | 2017000935 A1 | 1/2017 |

* cited by examiner

SMELTING ASSEMBLY FOR THE PRODUCTION OF STEEL

TITLE OF THE INVENTION

CROSS-REFERENCE TO RELATED APPLICATIONS

The present application is a 371 of International application PCT/EP2019/055408, filed Mar. 5, 2019, which claims priority of DE 10 2018 203 279.3, filed Mar. 6, 2018, and DE 10 2019 105 498.2, filed Mar. 5, 2019, the priority of these applications is hereby claimed and these applications are incorporated herein by reference.

BACKGROUND OF THE INVENTION

The invention relates to an improved smelting assembly for the production of steel, having a hearth part; a fireproof cladded, annular, water-cooled, cylindrical upper furnace onto which a conical hat which closes toward the top and has openings for guiding exhaust gas is able to be placed.

Steel producers who use blast furnace/BOF converter routes are confronted with increasingly stringent requirements in terms of low-emission production of steel. Attempts have been made to react to tighter environmental requirements by using complex exhaust gas purification and the careful selection of primary ingredients. Furthermore, however, there is also a shrinking demand for a number of primary ingredients so that the specialized converter routes are to some extent not running at capacity, this in turn having a negative effect on production costs.

Scrap is a recycled material which can be used again and again for the production of steel. The scrap prices are subject to intense variation. Apart from the chemical purity and the degree of processing, the local availability is also a decisive factor in terms of the respective price.

The production of steel (basic oxygen steel and electric furnace steel) accounts for 7% of the worldwide anthropogenic air pollution. If the mining of ore and the transportation of the latter is included, a figure of 10% can be assumed.

The prices for $CO_2$ emission certificates in industrialized countries are steadily increasing. However, the statutory requirements for emissions are also being dramatically tightened in emerging economies and developing countries. The steel producers are required to drastically lower their $CO_2$ emissions.

In the medium term, it will be necessary for the mining of ore as well as the smelting of iron ore to be decreased. The production of steel in the future is to largely take place by recycling (EAF). The emissions of EAF are approximately 75% lower in comparison to BOF.

In the long run, the mining of iron ore and the production of pig iron will be decreased and the proportion of recycling in the production of steel will increase. Additionally, the replacement of carbon carriers by less environmentally harmful reduction agents is on the agenda of the iron ore producers.

A retrofit system for a EAF furnace for converting the latter to a BOF converter is known from WO 2017/000935 A1. These retrofit systems have indeed been successful but suffer from the disadvantage that said retrofit systems are then limited to liquid ingredients since a furnace retrofitted in this way is then operated as a converter and any modification is intensive in terms of costs and time.

SUMMARY OF THE INVENTION

It is an object of the present invention to make available a smelting assembly which enables the flexible processing of the most varied ingredients also in the solid and/or liquid aggregate state and, while taking into account different steel qualities, minimizes the tap-to-tap times while using different ingredients and simultaneously reducing $CO_2$.

This object is achieved by the smelting assembly being conceived for the running mode without a smelting current (that is to say without an input of electric energy) as well as for the running mode with a smelting current, and the running mode of the smelting assembly is variable by changing the furnace cover, wherein the conical furnace cover for the running mode without a smelting current has at least one opening through which the at least one top lance for injecting a process gas is able to be introduced into the upper furnace, and the conical furnace cover for the running mode with a smelting current has at least one opening through which the at least one graphite electrode is able to be introduced into the upper furnace, and a multiplicity of lateral wall injectors in the cylindrical upper furnace are disposed so as to be radially encircling in such a manner that the top lance and the lateral wall injectors in the operating position are able to be aligned toward a melt level of a melt which for oxidizing is situated in the hearth part.

The smelting assembly according to the invention enables the environmentally harmful process using hot metal as an ingredient to be interrupted for a certain time, in steps to be reduced to zero, and to finally enable the shutdown of the blast furnace using the same smelting assembly. On account of the use of scrap and solid input material instead of pig iron, high requirements can be set for the steel quality and the steel purity. Proven technologies of the BOF converter and of the electric-arc furnace are combined with one another in the smelting assembly according to the invention in order to utilize the most efficient and flexible application possibilities of different forms of energy. At the same time, the smelting assembly according to the invention enables a flexible variation of material associated with a minor set-up time for the furnace plant.

According to one advantageous embodiment of the smelting assembly according to the invention, for suppressing intense melt slack splashes and thus for avoiding a formation of skull on the smelting assembly and in particular in the upper furnace, the top lance and the lateral wall injectors are able to be operated simultaneously and with mutually adapted volumetric flows.

For the running mode with a smelting current, in which various mixtures of metallurgical ingredients are present in the smelting assembly, the furnace cover can be interchanged so that at least one graphite electrode can be introduced into the hearth part of the smelting assembly.

In one particular embodiment of the smelting assembly according to the invention, for the running mode with a smelting current at least one graphite electrode and a maximum of three graphite electrodes are able to be introduced through the openings of the furnace cover.

It is furthermore provided that in an optimal use of the lateral wall injectors and the top lance, between 10% and 50% of the gas required for oxidizing can be injected through the lateral wall injectors and 90% to 50% of said gas can be injected through the top lance into the melt situated in the smelting assembly, said injections taking place simultaneously and in a mutually adapted manner. On account of the optimum mixing ratio between the top lance and the lateral wall injectors, melt and slack splashes can be reduced in such a manner, this in turn pre-empting any formation of skull in the vessel.

The metallic ingredients for the production of carbon steel in the smelting assembly according to the invention herein can be divided into the following groups:

I. liquid pig iron (also referred to as hot metal), solid pig iron in the form of pig iron ingots or granulated pig iron (GPI);
II. sponge iron (DRI=direct reduced iron) in cold or hot batches;
III. HBI (hot briquetted iron), CBI (cold briquetted iron);
IV. scrap, highly processed (shredder, double-chaffed, parcels);
V. scrap with a low degree of preparation (HMS 1, HMS 2), contaminated;
VI. scrap (scrap from refuse incinerators, shavings);
VII. Special materials which are used as iron carriers or coolants in the steel production process (synthicon, iron carbide).

Groups I-IV represent so-called virgin ingredients which do not contain any undesirable steel tramp elements (for example Cu, Cr, and Ni). It is necessary for a certain proportion of said virgin ingredients to be used in several steels in order for the quality of the final product to be ensured. The production of said ingredients is demanding in terms of energy and is thus highly environmentally stressful.

Groups V-VII represent carbon steel scrap of variable quality and different degrees of preparation. Scrap is recycled material. A higher degree of preparation and a lower degree of chemical contamination leads to higher prices for this scrap.

Group VIII represents all special materials which are utilized as ingredients for the production of steel.

The prices for the metallic ingredients differ significantly, depending on the production method or the processing method.

In the case of the ingredients of groups I and II the prices for iron ore (pellets) and coke are decisive for the cost of the production of pig iron. The market for iron ore is controlled by a few producers. Smelting works which do not possess their own mines are exposed to the prices dictated by the market.

In the case of the ingredients of groups III and IV the requirements set for the quality of the iron ore (mostly ore pellets) are even higher than for the blast furnace process. The availability of such pellets is limited. This has an effect on the price of the pellets. Reduction gas is used for the dry reduction of the ore. The availability ultimately decides the local price. DRI contains 5%-10% of gangue, a proportion of FeO, and in terms of the carbon content (energy!) is below pig iron. More energy is required for smelting these ingredients than for the smelting of pig iron. The ingredients listed here are less expensive in comparison to those of groups I and II.

All ingredients are able to be used in a flexible manner by way of the smelting assembly according to the invention, since the latter can be operated in a manner similar to that of a BOF. The proportion of scrap (cooling scrap) or of another coolant herein can be lowered to approximately 15%. Oxygen is introduced by means of lateral wall lances and a top lance. The set of issues of the formation of skull in the furnace vessel when using normal EAFs solely in the injector operation, that is to say without any input of electric energy, is avoided on account of a modified furnace geometry and the combination of lateral wall injectors and a top lance in the smelting assembly according to the invention.

Should sufficiently large quantities of liquid pig iron temporarily or permanently not be available during the operation of the smelting assembly, or should the production of liquid pig iron be discontinued, the smelting assembly can be operated like a normal EAF. The modification to the EAF running mode is not complicated and can take place between two campaigns.

Consequently, the smelting assembly can be conceived differently for the running mode without a smelting current, that is to say without any input of electric energy, and the running mode with a smelting current.

In an operation of the smelting assembly according to the invention without the use of a smelting current the procedure is as follows:
a. block tapping, check furnace;
b. set furnace upright, open cover, deploy the gate locking mechanism, pivot the gate outward, load scrap, pivot the gate inward, lock the gate inlet, lower the cover, lock the tilting platform (in sequence);
c. start the loading of liquid pig iron;
d. pivot oxygen top lance inward, lower and ignite;
e. successively switch on lateral wall injectors;
f. once the entire pig iron has been loaded, complete blasting of batch;
g. check temperature;
h. lift the top lance, unlock the furnace;
i. tap.

If the smelting assembly according to the invention is run with only a proportion of liquid pig iron, the procedure is as follows:
a. block tapping, check furnace;
b. set furnace upright, open cover, deploy the gate locking mechanism, pivot the gate outward, load scrap/iron carrier, pivot the gate inward, lock the gate inlet, lower the cover, lock the tilting platform, pivot electrode carrier frame inward, lower and ignite (in sequence);
c. switch on lateral wall injectors as burners;
d. start loading of liquid pig iron;
e. switch injectors from burner operation to lance operation;
f. once the entire pig iron has been loaded, complete batch;
g. check temperature;
h. lift electrodes, unlock furnace;
i. tap.

If no liquid pig iron is loaded, d. and f. are dispensed with. Points b., c. and f. are repeated in the case of batches in two baskets.

It becomes evident here in that the smelting assembly according to the invention is able to be used universally. When said smelting assembly is used for producing steel without a smelting current, said smelting assembly according to the invention combines many advantages of a BOF and those of an EAF. While the blasting rate is lower than in the case of the BOF, a very high productivity can be achieved since the non-productive times in utilizing the smelting assembly according to the invention are lower than in the case of the BOF.

Additionally, very positive dephosporization can be achieved when liquid pig iron with a high P content is used. In contrast to the BOF, the phosphor-containing slag can be continuously discharged.

On account of the simultaneous operation of the top lance and the lateral wall injectors (balanced blowing) very intense injecting is suppressed, and the formation of skull in the vessel is thus avoided. This is facilitated by the design of the cover region such that a formation of skull in the region of the manifold is also avoided. Between 10% and 50% of the gas (oxygen or suitable substituents) required for oxidizing are to be injected into the melt situated in the smelting assembly through the lateral wall injectors, and 90% to 50% are to be injected through the top lance.

When the smelting assembly according to the invention is operated with a smelting current (thus with various mixtures of metallic ingredients), the vessel is changed by way of a cover and the furnace can now be operated using electrodes. On account of the lateral wall injectors, the furnace continues to be highly effective.

Should pig iron no longer be available, high productivity is ensured by the corresponding use of electric energy. In contrast to the BOF, only the proportion of virgin ingredient which is required has to be placed for producing steel of high quality in this instance. The use of these iron carriers in the production of which the environment is significantly stressed can thus be reduced.

BRIEF DESCRIPTION OF THE DRAWING

The present invention will be explained in more detail hereunder by means of an exemplary embodiment. In the figures.

DETAILED DESCRIPTION OF THE INVENTION

Figure 1:
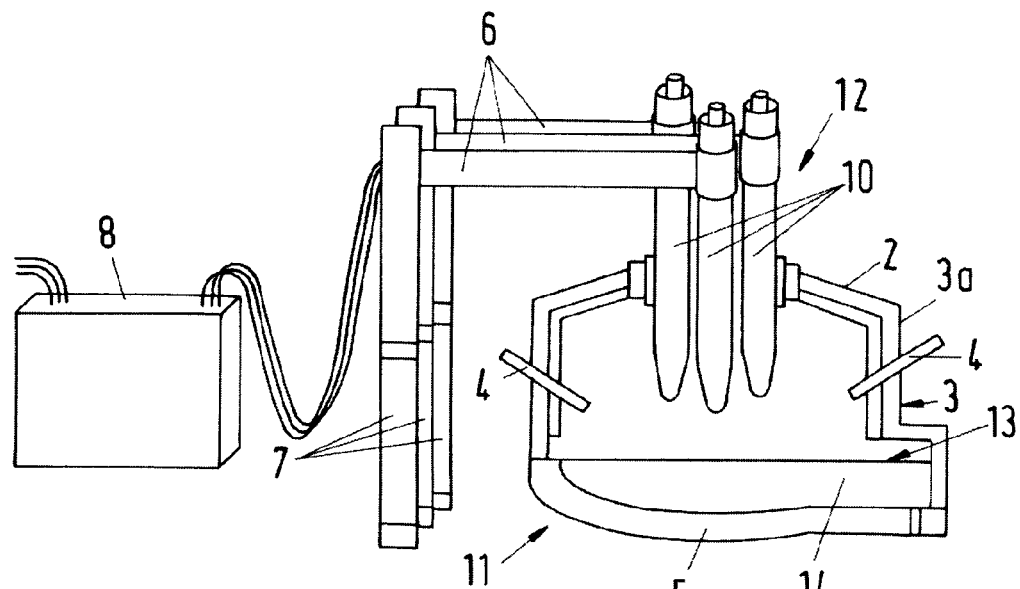
FIG. 1 shows the schematic illustration of the smelting assembly according to the invention in a partially sectional illustration from which the hybrid construction mode having BOF components and EAF components can be seen.
Figure 2:
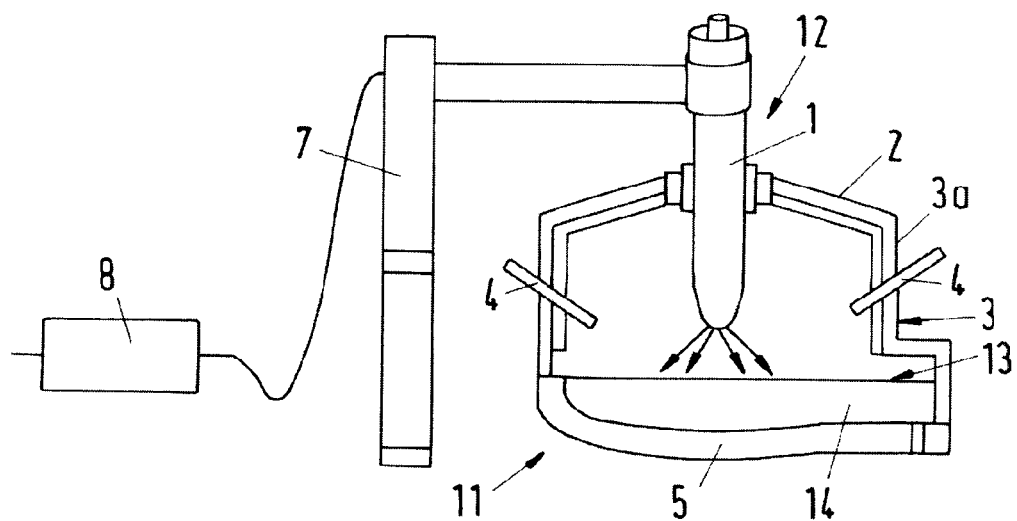
FIG. 2 shows the illustration according to FIG. 1, with the difference that a top lance instead of graphite electrodes has been introduced into the smelting assembly by way of at least one electrode support arm.

As is illustrated in FIG. 1 and FIG. 2, the present smelting assembly 11 is composed of a lower vessel 5 (hearth part) and an upper vessel 3, said vessels being connected to one another in a form-fitting manner. The lower vessel 5 is cladded with a fireproof material and serves for receiving a melt. The upper vessel 3 is assigned a water cooling system 3a. The upper vessel 3 can be covered with a hat/cover 2. The hat/cover 2 is assigned at least one opening 12 through which either smelting electrodes, in particular graphite electrodes 10 (the latter in this embodiment being three graphite electrodes), or at least one top lance 1 can be introduced into the smelting assembly 11. The hat/cover 2, like the upper vessel 3, is water-cooled.

The graphite electrodes 10 and the top lance 1 herein are controlled by way of electrode carrier columns 7 and electrode arms 6 connected thereto, so as to be able to move said graphite electrodes 10 into the smelting assembly 11 and out of the latter as required.

The upper furnace 3 has a substantially round/cylindrical lateral wall 3a. The lateral wall 3a is assigned openings which are radially encircling on the outside. Lateral wall injectors 4 can be introduced through the openings in the lateral wall 3a, said lateral wall injectors 4 then being able to be aligned toward a melt 14 to be treated in the lower furnace 5. The top lance 1 and the lateral wall injectors 4 in the operating position herein are aligned toward a melt level 13 of the melt 14 which for oxidizing are situated in the lower vessel/hearth part 5.

As is illustrated in FIG. 2, the top lance 1 can be supplied with oxygen by way of a valve station (oxygen valve station) 8. The top lance 1 herein is controlled by the oxygen valve station 8 and moved according to corresponding parameters.

For the smelting operation in the manner of an EAF, the graphite electrodes 10 are supplied with corresponding electric energy by means of a transformer 9, as is illustrated in FIG. 1.

It is provided that the lateral wall injectors 4 (lateral lances) and the top lances 1 (more than one top lance may be provided) are run conjointly, or a gas (typically oxygen) can be injected simultaneously. In this configuration, lateral wall injectors 4 in the upper vessel 3 (or in the cylindrical lateral wall 3a, respectively) and one or a plurality of top lances 1 should always be run conjointly. This running mode should take place at an optimized mixing ratio between 10% and 50% by way of the lateral injectors and 90% to 50% by way of the top lance 1 (or top lances, respectively). On account of this running mode, substantially more gas (oxygen) per unit of time can be injected into the melt 14 in a small smelting assembly 11 without significantly more splashes arising.

List of Reference Signs

1 Top lance
2 Water-cooled furnace cover/hat (hood)
3 Water-cooled upper vessel/upper furnace
3a Lateral wall upper vessel
4 Lateral wall injectors
5 Lower furnace having a fireproof cladding (hearth part)
6 Electrode arm
7 Electrode carrier columns
8 Valve station (oxygen valve station)
9 Transformer
10 Smelting electrodes/graphite electrodes
11 Smelting assembly
12 Cover opening(s)
13 Melt level
14 Melt

The invention claimed is:

1. A smelting assembly for production of steel, comprising:
   a single vessel comprised of:
      a fireproof-cladded lower furnace/hearth part with bottom tapping; and a substantially cylindrical, water-cooled, upper furnace part,
   wherein the smelting assembly is configured for a running mode without a smelting current as well as for a running mode with a smelting current;
   a first conical furnace cover for the running mode without a smelting current has at least one opening through which at least one top lance for injecting a process gas is introducible into the upper furnace;
   a second conical furnace cover for the running mode with a smelting current has at least one opening through which at least one graphite electrode is introducible into the upper furnace, wherein the first and the second conical furnace covers are placeable onto and removable from the upper furnace part, wherein the smelting assembly is configured so that the running mode is variable by changing between the first and the second furnace covers; and
   a plurality of lateral wall injectors arranged spaced in the cylindrical upper furnace part so as to be radially encircling so that the top lance and the lateral wall injectors in an operating position are aligned toward a melt level of a melt which for oxidizing is situated in the lower furnace/hearth part wherein the lateral wall injectors and the top lance are configured so that between 10% and 50% of a gas required for oxidizing is injected through the lateral wall injectors and 50% to 90% of the gas is injected through the top lance into the melt in the smelting assembly, said injections taking place simultaneously and in a mutually adapted manner.

2. The smelting assembly for production of steel according to claim 1, wherein the top lance and the lateral wall injectors are configured to operate simultaneously and with mutually adapted volumetric flows in a coordinated manner so as to suppress intense melt slag splashes and avoid a formation of skull on the smelting assembly.

3. The smelting assembly for production of steel according to claim 1, wherein for the running mode with a smelting current, in which various mixtures of metallurgical ingredients are present in the smelting assembly, the furnace cover is convertible so that the at least one graphite electrode is introducible into the lower furnace/hearth part.

4. The smelting assembly for production of steel according to claim 3, wherein for the running mode with a smelting current, the furnace cover is configured so that a maximum of three graphite electrodes are able to be introduced through the openings of the furnace cover.

5. The smelting assembly for production of steel according to claim 1, wherein the top lance and the lateral wall injectors are configured to provide an optimal mixing ratio between the top lance and the lateral wall injectors so that melt and slag splashes are reduced and a formation of skull in the upper furnace is minimized.

6. The smelting assembly for production of steel according to claim 1, further comprising a specially shaped furnace manifold connected to the furnace cover, the furnace manifold being configured so as to be inclined and have a cross section adapted to process conditions so that a maximum flow rate of exhaust gas created during oxidizing does not exceed 50 m/s.

* * * * *